United States Patent [19]

Regueiro

[11] Patent Number: 5,261,362
[45] Date of Patent: Nov. 16, 1993

[54] PISTON ASSEMBLY HAVING MULTIPLE PIECE COMPRESSION RING

[75] Inventor: Jose F. Regueiro, Rochester Hills, Mich.

[73] Assignee: Chrysler Corporation, Highland Park, Mich.

[21] Appl. No.: 985,100

[22] Filed: Nov. 30, 1992

[51] Int. Cl.$^5$ ............................................. F16J 9/16
[52] U.S. Cl. ............................... 123/193.6; 277/218
[58] Field of Search ............... 123/193.6; 277/216, 277/217, 218, 138, 139, 140

[56] References Cited

U.S. PATENT DOCUMENTS

| | | | |
|---|---|---|---|
| 1,705,648 | 3/1929 | Schmitt | 277/218 |
| 2,278,019 | 3/1942 | Phillips | 277/216 |
| 2,638,390 | 5/1953 | Neeme | 277/218 |
| 4,475,739 | 10/1984 | Nakajima et al. | 277/216 |
| 4,615,531 | 10/1986 | Green | 277/216 |
| 4,669,736 | 6/1987 | Meijer | 277/216 |
| 4,926,811 | 5/1990 | Parsons | 277/216 |

FOREIGN PATENT DOCUMENTS

| | | | |
|---|---|---|---|
| 0278564 | 10/1927 | United Kingdom | 277/217 |
| 0567856 | 3/1945 | United Kingdom | 277/216 |

Primary Examiner—Tony M. Argenbright
Assistant Examiner—M. Macy
Attorney, Agent, or Firm—Kenneth H. MacLean

[57] ABSTRACT

A piston assembly for an internal combustion engine includes a piston having at least one annular compression ring groove within which is disposed a plurality of split piston rings. Each of the rings includes a ring gap and the rings are arranged in the groove with the respective gaps angularly misaligned and with adjacent flat surfaces of the rings contacting one another so as to close the gaps to prevent fluids from passing through the gaps when the piston operates in its cylinder bore.

8 Claims, 1 Drawing Sheet

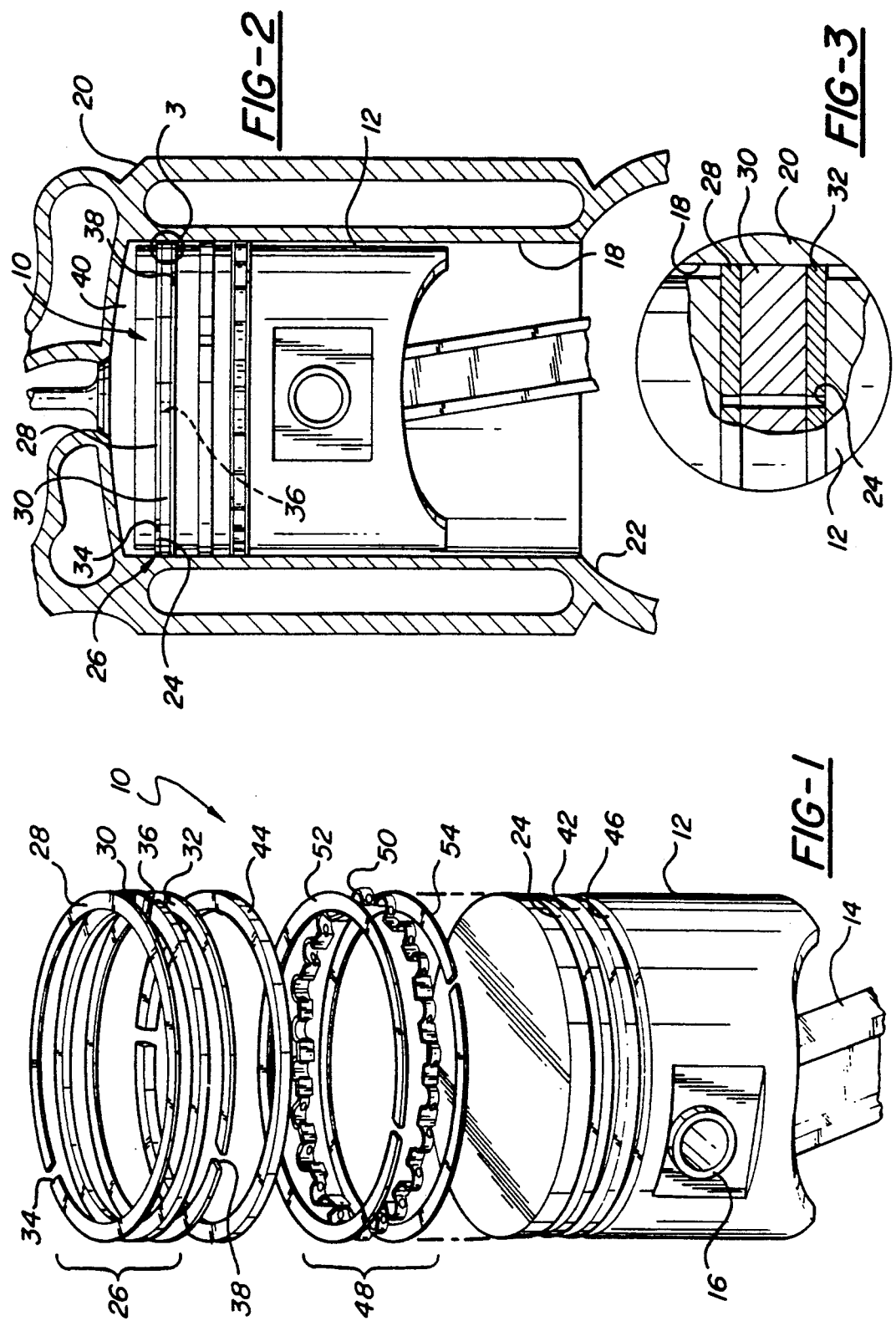

PISTON ASSEMBLY HAVING MULTIPLE PIECE COMPRESSION RING

TECHNICAL FIELD

This invention relates to the construction of pistons and piston rings for internal combustion engines, compressors and other equipment and, more particularly, to the construction and arrangement of compression rings on a piston.

BACKGROUND OF THE INVENTION

In piston-type internal combustion engines, piston rings are used to prevent both losses of air and/or a mixture of air and fuel during the compression stroke of the pistons as well as preventing the products of combustion from entering the engine crankcase during the expansion stroke. During the compression and exhaust strokes of the pistons, lubricating oil is supplied to the cylinder walls of the engine. Such lubricating oil bathes the cylinders when the pistons are in any position within their stroke except at bottom dead-center. The rings of the piston scrape this oil into the crankcase during the downward intake and expansion strokes of the piston.

The rings of the piston are split so that there is a ring gap formed between adjacent opposite ends of each ring. The gap can be measured to determine if the appropriate ring size is being used and the split construction facilitates installation of the rings within associated ring grooves extending circumferentially about the piston. The gaps further enable radial expansion and contraction of the rings caused by temperature variation and also to permit the rings to radially expand against the cylinder walls to compensate for wear. As the piston rings and cylinder walls continue to wear, the rings expand further outwardly increasing the size of their respective gaps. Thus, the gaps serve an important role in proper functioning of the piston rings.

However, as well recognized by those skilled in this industry, the ring gaps are also detrimental to the performance of the engine. During the downward intake stroke of the piston, the gaps allow small quantities of the lubricating oil to enter the combustion chamber and likewise allow small quantities of the air or air/fuel mixture to enter the crankcase during the compression and expansion strokes of the pistons as well as some portions of the exhaust stroke. Oil in the combustion chamber is undesirable as it reduces performance, increases emissions, and increases oil consumption. The combustion gases entering the crankcase mixes with the crankcase oil causing it to degrade and produce noxious gases which eventually leave the crankcase as pollutants.

Heretofore, there have been several approaches taken to solve the problem of gas and oil blow-by past the piston rings in an effort to increase engine efficiency and decrease emissions and oil consumption. These efforts include increasing the ring pressure on the cylinder walls and adding additional grooves and rings to the piston. The first approach increases friction between the piston rings and cylinder walls and thus negatively affects fuel consumption and increases the rate of wear. The latter approach adds to the size, weight and complexity of the piston and still permits a certain amount of blow-by since each additional ring is disposed in its own groove and hence spaced from the other rings allowing gas and oil to continue passing through the ring gaps.

Multi-piece compression-type piston rings, have been proposed prior to this invention but are usually limited to the oil control ring of the piston. Such oil control rings include a pair of steel rails disposed in a single oil control ring groove of the piston and separated by a discreet spacer/expander element which maintains the rails spaced from one another and serves to force the rails with great radial tension against the cylinder walls when the piston is disposed within the cylinder. The rails are constructed much like the remaining compression rings of the piston but are generally much thinner and are made of steel with their rounded contact edge chrome plated. Because the rails are spaced from one another the oil and gases can pass through the gaps of the rails.

Many of the same problems mentioned above also effect piston-type air compressors, as well as other mechanisms which utilize pistons to raise the pressure of working fluids or to extract power from them (piston-based expanders).

Thus there is a need to provide a piston assembly having piston rings constructed and arranged so as to eliminate or substantially reduce the amount of oil and gas blow-by past the rings during operation of the engine, compressor or other machinery.

SUMMARY OF THE INVENTION

This invention overcomes the problems discussed above by providing a piston assembly having an annular compression ring groove and at least two split compression rings disposed in the groove with the gaps of the rings angularly misaligned and with adjacent side surfaces of the rings directly contacting one another advantageously sealing the gaps to effectively prevent the passage of fluids, such as oil and gases within a piston cylinder of an internal combustion engine through the gaps in the rings.

Another advantage of this invention resides in the substantial reduction of radial tension applied by such a multiple-piece compression ring as compared to that of the single-piece compression rings. Less tension is needed on the multi-piece rings of this invention since each ring piece can expand outwardly against the cylinder walls independently of the other ring pieces to give improved ring conformity with the cylinder walls with less tension. The lower tension results in a corresponding increase in fuel efficiency and decrease in wear.

The multi-piece compression ring of this invention may also result in a size and weight reduction of the piston assembly by requiring a fewer number of compression ring grooves and compression rings further adding to an increased fuel economy and reduction in the weight and complexity of the piston assembly.

This invention is useful for automotive and other internal combustion engine applications as well as other mechanisms which utilize pistons to raise the pressure of working fluids or to extract power from working fluids.

BRIEF DESCRIPTION OF THE DRAWINGS

These and other features, objects and advantages of this invention will become more apparent from the following detailed description and drawings, in which:

FIG. 1 is a fragmentary exploded perspective view of a piston assembly constructed according to this invention;

FIG. 2 is a fragmentary cross-sectional view of an engine block having the piston of FIG. 1 installed therein; and FIG. 3 is an enlarged view of the encircled area indicated at 3 in FIG. 2.

DETAILED DESCRIPTION OF THE PREFERRED EMBODIMENT

Turning now in more detail to the drawings, a fragmentary exploded perspective view of a piston assembly constructed according to a presently preferred embodiment of this invention is indicated generally at 10 in FIG. 1 and comprises a cylindrical piston 12 mounted pivotally to a connecting rod 14 by a piston pin 16 in known manner. The piston 12 is adapted for traveling with reciprocating sliding movement inside a piston cylinder 18 of an internal combustion engine, compressor or expander 20, a fragmentary cross-sectional view of which is shown in FIG. 2. The piston could also be used in a compressor or expander device. The connecting rod 14 is coupled to a crank shaft (not shown) mounted within a crankcase cavity 22 of the engine wherein rotation of the crank shaft imparts a reciprocating up and down movement of the piston 12 as viewed in FIG. 2. In the case of a four stroke internal combustion engine, the crank shaft moves the piston 16 through the various intake, compression, expansion and exhaust strokes.

The piston 12 includes at least one annular compression ring groove 24 extending circumferentially about an outer periphery of the piston 12. The groove 24 has a uniform width and depth.

A multiple-piece compression ring assembly 26 is disposed in the groove 24 and importantly comprises two or more discrete compression rings, there being three shown in the Figures wherein the first of the three is indicated at 28, the second at 30, and the third at 32. Each of these rings 28, 30, 32 is substantially circular and of a split construction such that each ring includes an associated pair of adjacent split ends spaced from one another so as to form associated ring gaps 34, 36, 38 respectively there. The ends are perfectly squared off so as to be perpendicular to the thickness of the rings.

Importantly, the rings 28, 30, 32 are arranged in the groove 24 having their respective gaps 34, 36, 38 angularly misaligned and with adjacent flat side surfaces (i.e., adjacent top and bottom surfaces) of the rings substantially contacting one another (i.e., either directly contacting or having a thin layer of lubricating oil at the interface) in order to axially close off or seal the gaps 34, 36, 38 thereby effectively producing a zero gap or gapless compression ring so as to prevent fluids within the piston cylinder from passing through the gaps 34, 36, 38 in the rings (i.e., eliminate or substantially reduce blowby as compared to conventional single-piece compression ring arrangements having open ring gaps). When installing the rings 28, 30, 32 it is preferable to orient the gaps 34, 36, 38 with the maximum amount of angular spacing. Thus, when employing two rings, for example, the gaps should be spaced 180° apart, with three rings 120° apart (as shown in FIGS. 1 and 2), with four rings 90° apart, and so on.

Although the individual rings are free to rotate within the groove 24 during operation of the piston assembly 10, statistically there is little probability of the gaps ever aligning so as to permit the passage of fluids therethrough. The probability of alignment decreases with increasing numbers of compression rings. With internal combustion engine 20, the fluids within the piston cylinder 18 include oil which splashes up into the cylinder 18 from the crankcase 22 and gaseous fluids such as air and/or a mixture of air and fuel injected or otherwise drawn into a combustion chamber 40 of the engine 20 on the working side (i.e., top portion above the compression ring assembly 26) of the piston 12. Importantly, the multiple-piece compression ring assembly 26 substantially prevents any oil from entering the combustion chamber 40 and likewise prevents any gaseous fluids from the combustion chamber from entering the crankcase 22.

One or more of the rings of the assembly 26 preferably comprises a very thin steel rail of the type typically used for multiple-piece oil control rings, but with a deeper crosssection. In the embodiment shown, the first 28 and third 32 rings comprise such steel rails. The second ring 30 is a conventional split compression ring. It is preferred that the uppermost ring (i.e., the fire ring) be a steel rail whereas the remaining rings can be compression rings or rails or combinations thereof. As can be seen best in FIG. 3, the steel rails are substantially thinner than the compression ring and have rounded outer contact edges whereas the conventional compression ring 30 has a flat or "barrel-shaped" contact edge with the cylinder wall 18. The rails preferably are made of steel which may be plated with chrome.

Often times, the piston cylinder 18 will distort under mechanical or thermal loads losing its preferable round bore shape and tending toward an oval shape. Conventional single-piece compression rings have difficulty conforming to such changes in cylinder wall shape producing a small amount of clearance between the ring and cylinder wall which in turn allows crankcase oil to enter the combustion chamber 40 of the cylinder 18. Increasing the ring tension against the cylinder wall helps to some degree but is generally undesirable as it increases the friction between the ring and cylinder wall thereby increasing wear and reducing fuel efficiency.

Importantly, the multiple-piece compression ring assembly 26 of this invention overcomes such ring conformability problems experienced with conventional single-piece compression rings in that each of the ring pieces 28, 30, 32 can conform in different arcs of the piston cylinder providing a greater opportunity for the compression ring assembly 26 as a whole to conform to the outer roundness of the piston cylinder 18. That is, in regions where one of the rings may be deficient in conforming to the cylinder wall, there is opportunity for one or more of the other rings in the assembly 26 to achieve conformance. Also important is that the multiple-piece compression ring assembly 26 can be utilized with substantially less (i.e., 50% or more) radial tension than the conventional single-piece compression rings and yet provide equal or greater ring conformability. This feature is advantageous in that it decreases piston ring and cylinder wear and increases engine performance and fuel economy. Consequently, each of the rings in the multiple-piece compression ring assembly 26, including the steel rails, can be utilized without a circumferential expander element, as is normally associated with multiple-piece oil control rings which act to expand the steel rails with great force against the cylinder wall. Hence, the compression ring groove 24 is devoid of any such expanding elements as shown in FIG. 3.

The piston 12 may also include one or more additional annular compression ring grooves 42 extending circumferentially about the piston 12 within which may be disposed another multiple-piece compression ring assembly as described above or a conventional single-piece split compression ring 44 as shown in the drawings. It is believed, however, that additional compression rings and grooves may not be required for most automotive internal combustion engine applications. Reducing the number of ring grooves reduces the weight and height of the piston, significantly reducing the height and weight of the engine block.

The piston 12 may also include an oil control ring groove 46 below the compression ring grooves 24, 42 within which may be disposed any of a number of conventional oil control rings such as the multiple-piece control ring indicated at 48 in the Figures. Such an oil control ring 48 includes a circumferential expander spacer element 50 sandwiched between and separating a pair of thin steel rails 52, 54 which are substantially similar (except for the radial depth) in construction to the rails 28, 32.

In operation, as the piston 12 is moved downwardly through the intake stroke, air and/or a mixture of air and fuel is injected or otherwise drawn into the combustion chamber 40. The downward movement of the piston 12 creates low pressure within the chamber 40 thus creating the opportunity for crankcase oil to be drawn on into the chamber. The multiple-piece compression ring assembly 26, however, closes the gaps in the rings 28, 30, 32 and conforms closely to the contours of the cylinder wall 18 so as to prevent such oil from entering the combustion chamber 40. Similarly, as the piston 12 move upwardly through the compression stroke, the compression generated in the process above the piston forces air or air-fuel mixture into the crankcase 22, as "blowby". The multiple-piece compression ring assembly 26 also prevents such combustion chamber gases from entering the crankcase 22.

While the above description was directed toward a piston assembly for use with an internal combustion engine, it will be appreciated to one of ordinary skill in the art that the same multi-piece compression ring arrangement may be employed on other types of machinery using pistons for the purpose of pumping or compressing fluids and hence such applications are within the scope of this invention.

While a preferred embodiment of this invention has been shown and described, other modifications will be apparent to those skilled in the art. Accordingly, the scope of this invention is set forth in the following claims.

What is claimed is:

1. An oil lubricated piston for operative reciprocating sliding movement within a cylindrical wall defining a piston cylinder of an internal combustion engine and cooperating therewith to provide a combustion chamber and a separate crankcase cavity, said piston comprising a cylindrical piston body having an outer periphery, an annular groove formed in said outer periphery, a compression ring assembly for said piston comprising first and second piston rings of metals suitable for operation in said cylinder of said internal combustion engine and operatively disposed in said groove, each of said rings having a first end and a second end to define a ring gap and having an arcuate section extending from said first end to said second end, each of said arcuate sections having continuous flattened top and bottom side surfaces extending from said first to said second end, said rings being arranged in said groove and extending outwardly therefrom for annular sealing contact with the wall of said cylinder, said rings being disposed in a stacked relationship and having direct contact with one another with said gaps arcuately spaced from one another and with adjacent flattened side surfaces of said rings contacting one another to overlie and seal said gaps to prevent the passage of fluids therethrough to thereby seal the combustion chamber from the crankcase cavity so that forces of combustion occurring in said combustion chamber can be transmitted by said piston operating in said chamber, and said rings being mounted for turning movement in said ring groove relative to each other during preciprocating sliding movement of said piston in said cylinder.

2. The piston of claim 1 wherein said first piston ring is a compression ring of predetermined thickness and the other of said rings is a rail having a thickness substantially less than the thickness of said compression ring, and further comprising an additional rail substantially identical to said first mentioned rail mounted in said groove, said compression ring being sandwiched between said rails and cooperating with said rails to optimize fluid sealing of said combustion chamber and said crankcase cavity.

3. The piston of claim 1 and further including a third compression ring having first and second ends defining a ring gap and having an arcuate section with continuous flattened top and bottom side surfaces extending from said first to said second end, and wherein said first mentioned compression rings are rails operatively mounted in said groove on opposite sides of said third compression ring with said gaps of all of said rings being arcuately offset with respect to one another.

4. The piston assembly of claim 3, wherein said piston has a top surface and one of said rails is a fire ring adjacent to said top surface.

5. The piston assembly or claim 3 wherein each said rails have substantially uniform thickness throughout the entire extent thereof and naturally expand into engagement with the wall of said cylinder.

6. The piston assembly of claim 3 wherein said rails and said ring are stacked in said groove and extend radially outward therefrom into contact with the wall defining said cylinder by the spring forces thereof.

7. The piston assembly of claim 1 wherein said piston includes an annular oil control ring groove below said groove mounting said compression rings and wherein an oil control ring is operatively disposed in said oil control ring groove.

8. The piston assembly of claim 3 wherein said piston includes a second annular compression ring groove formed between said first mentioned compression ring groove and said oil control ring and associated groove, said second compression ring groove having at least one compression ring disposed therein.

* * * * *